United States Patent [19]
Rousmaniere et al.

[11] Patent Number: 5,486,891
[45] Date of Patent: Jan. 23, 1996

[54] ECOLOGICAL SYSTEM FOR DELIVERING FILM UNITS, A CONTAINER FOR HOLDING FILM UNITS AND AN APPARATUS FOR PACKAGING TRASH FOR RECYCLING

[75] Inventors: Arthur S. Rousmaniere, Andover; Frederick Slavitter, Needham, both of Mass.

[73] Assignee: Polaroid-Corporation-Patent Department, Cambridge, Mass.

[21] Appl. No.: 324,030

[22] Filed: Oct. 14, 1994

[51] Int. Cl.$^6$ .................................................. G03D 9/00
[52] U.S. Cl. ........................................... 354/301; 220/359
[58] Field of Search ............................. 354/301, 83–93; 430/210; 220/359, 306; 206/498, 459, 4.23

[56] References Cited

U.S. PATENT DOCUMENTS

| | | |
|---|---|---|
| 1,631,658 | 6/1927 | Trefzger . |
| 3,116,927 | 1/1964 | Kuhlman ................................ 273/135 |
| 3,327,599 | 6/1967 | Murphy ...................................... 95/13 |
| 3,767,404 | 10/1973 | Harvey .................................... 430/210 |
| 4,000,816 | 1/1977 | Spruyt et al. ............................ 206/498 |
| 4,328,904 | 5/1982 | Iverson .................................... 220/256 |
| 4,903,832 | 2/1990 | Stewart ................................... 206/366 |
| 5,037,000 | 8/1991 | Selame .................................... 221/303 |
| 5,040,680 | 8/1991 | Wilson et al. ........................... 206/4.23 |
| 5,269,430 | 12/1993 | Schlaupitz et al. ...................... 220/306 |

*Primary Examiner*—D. Rutledge
*Attorney, Agent, or Firm*—John J. Kelleher

[57] ABSTRACT

A system for developing photographic film which is ecologically friendly includes a tray holding a pair of film cassettes. One cassette includes negative film sheets which is inserted into a camera where the negative sheets are exposed. The exposed sheets are delivered to a developing apparatus. A second cassette from the tray includes positive film sheets and it is delivered to the same developing apparatus. The empty tray is mounted on the developing apparatus. Each positive film sheet includes a rupturable pod of developer liquid for spreading between mated positive and negative film sheets. Exposed negative sheets and positive sheets are mated and the pod ruptured to spread liquid between the two as the mated sheets move in a first path into an imbibition chamber. A pick at the exit end of the imbibition chamber strips the evacuated pod, negative film sheet and residual developer liquid from the positive sheet and delivers them to the face of a ram. The ram pushes the negative film sheet and other trash materials into the tray originally transporting the cassettes. Subsequently, the positive cassette is deposited within the same container which is then transported to a site for recycling and disposal.

51 Claims, 8 Drawing Sheets

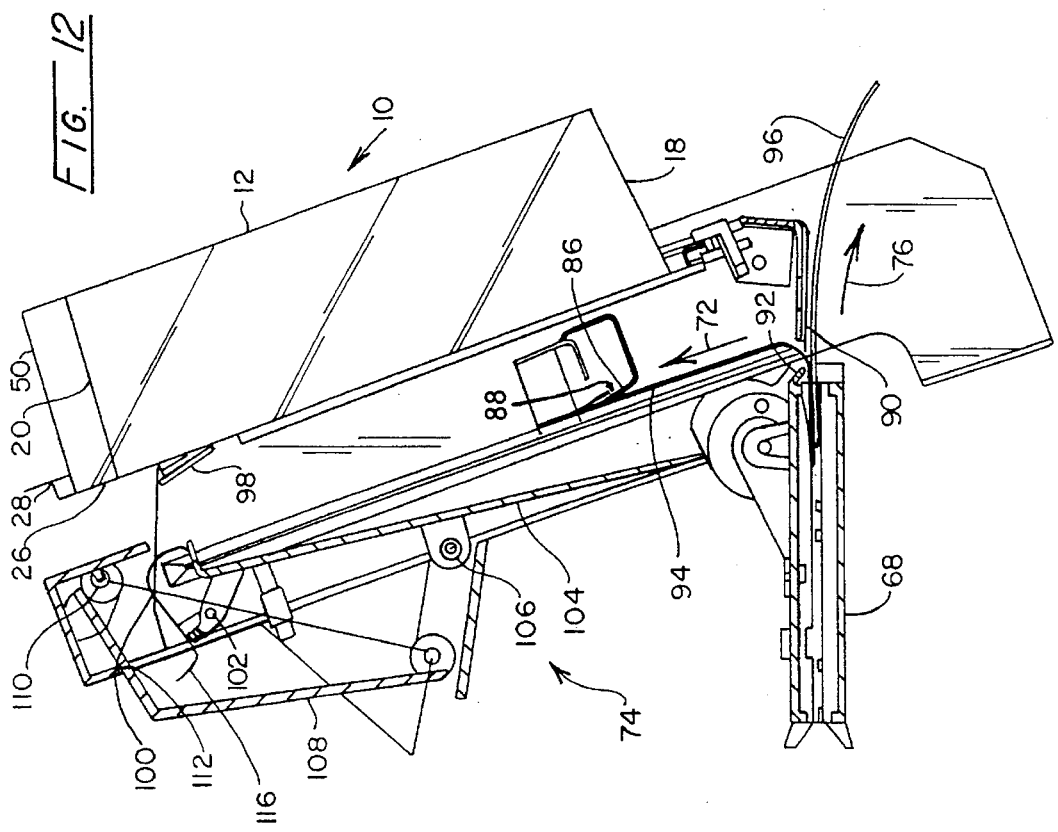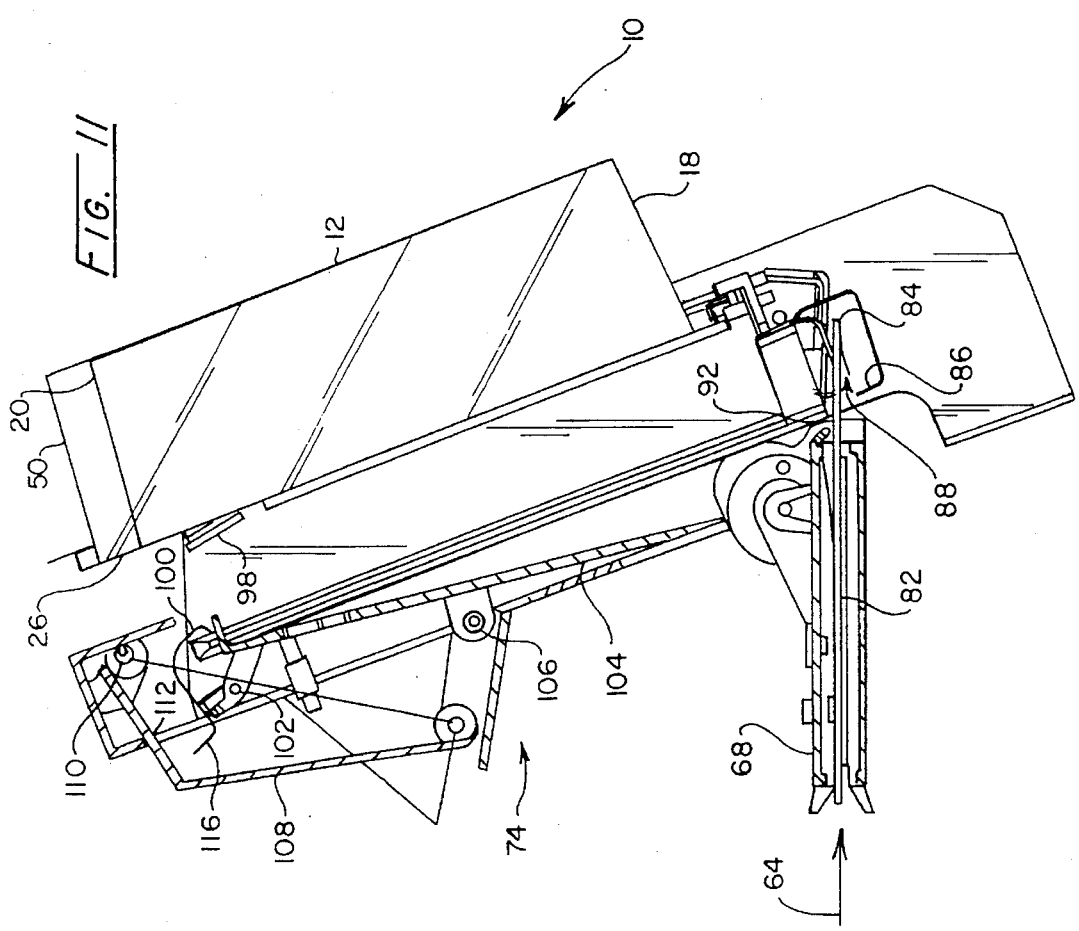

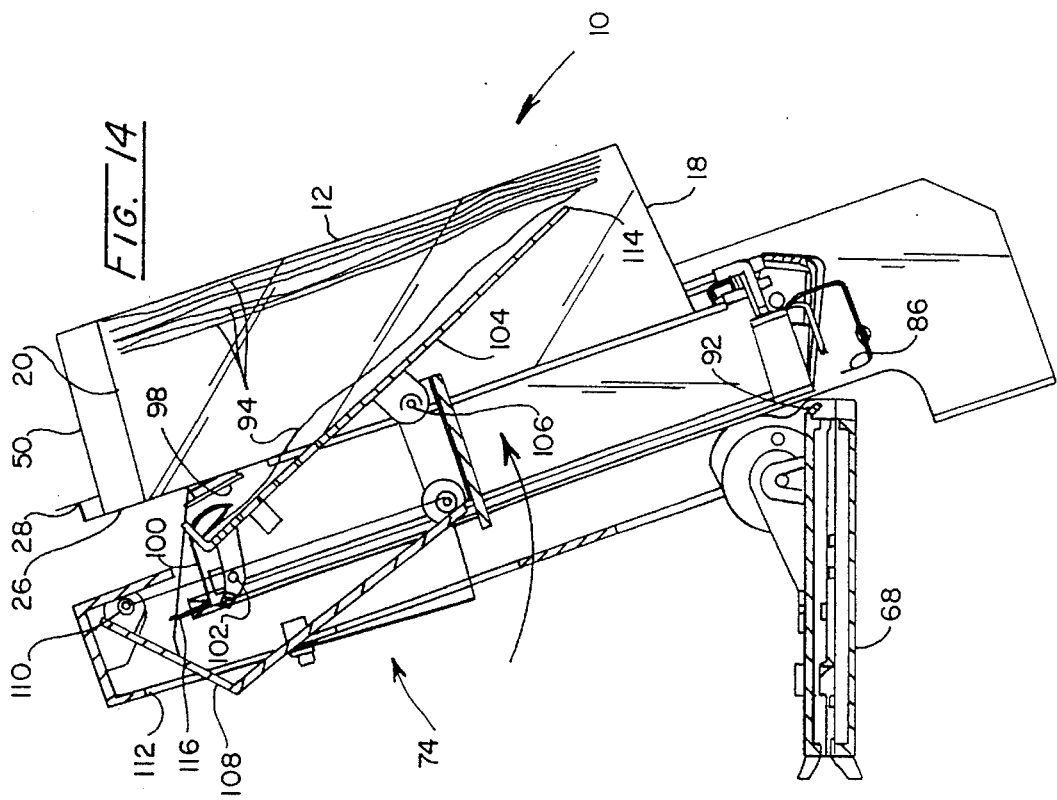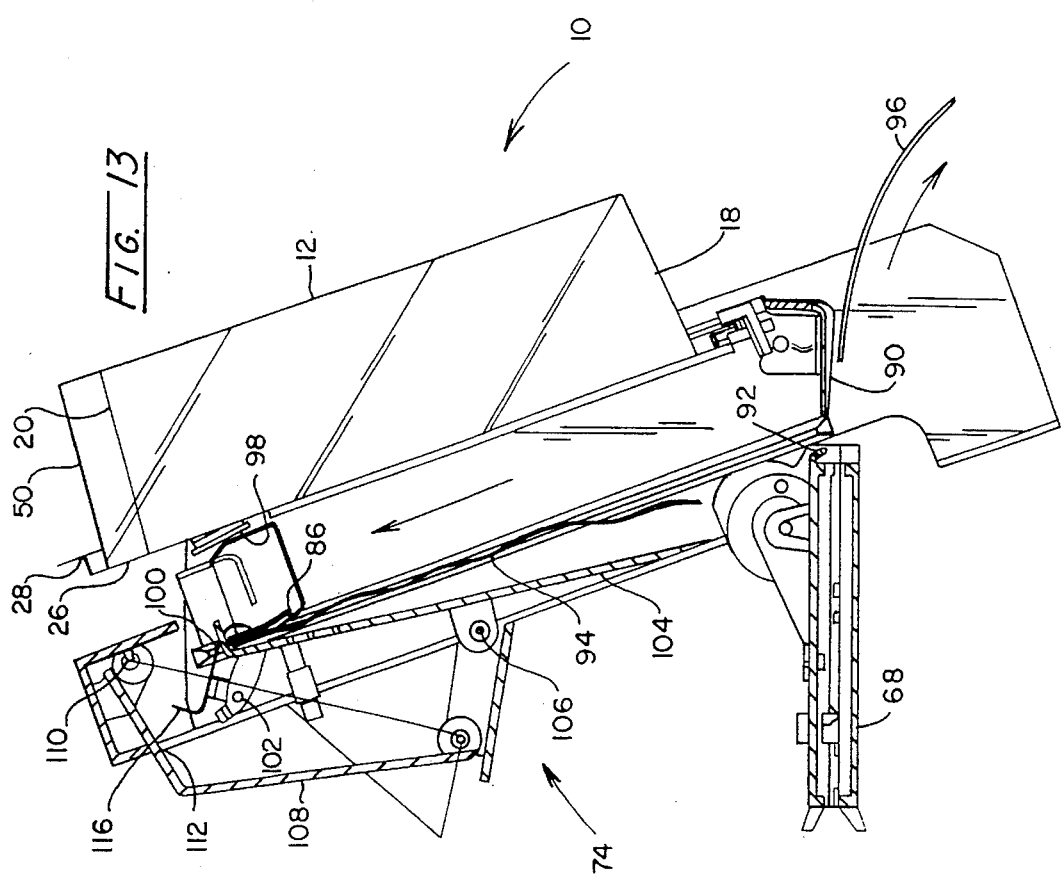

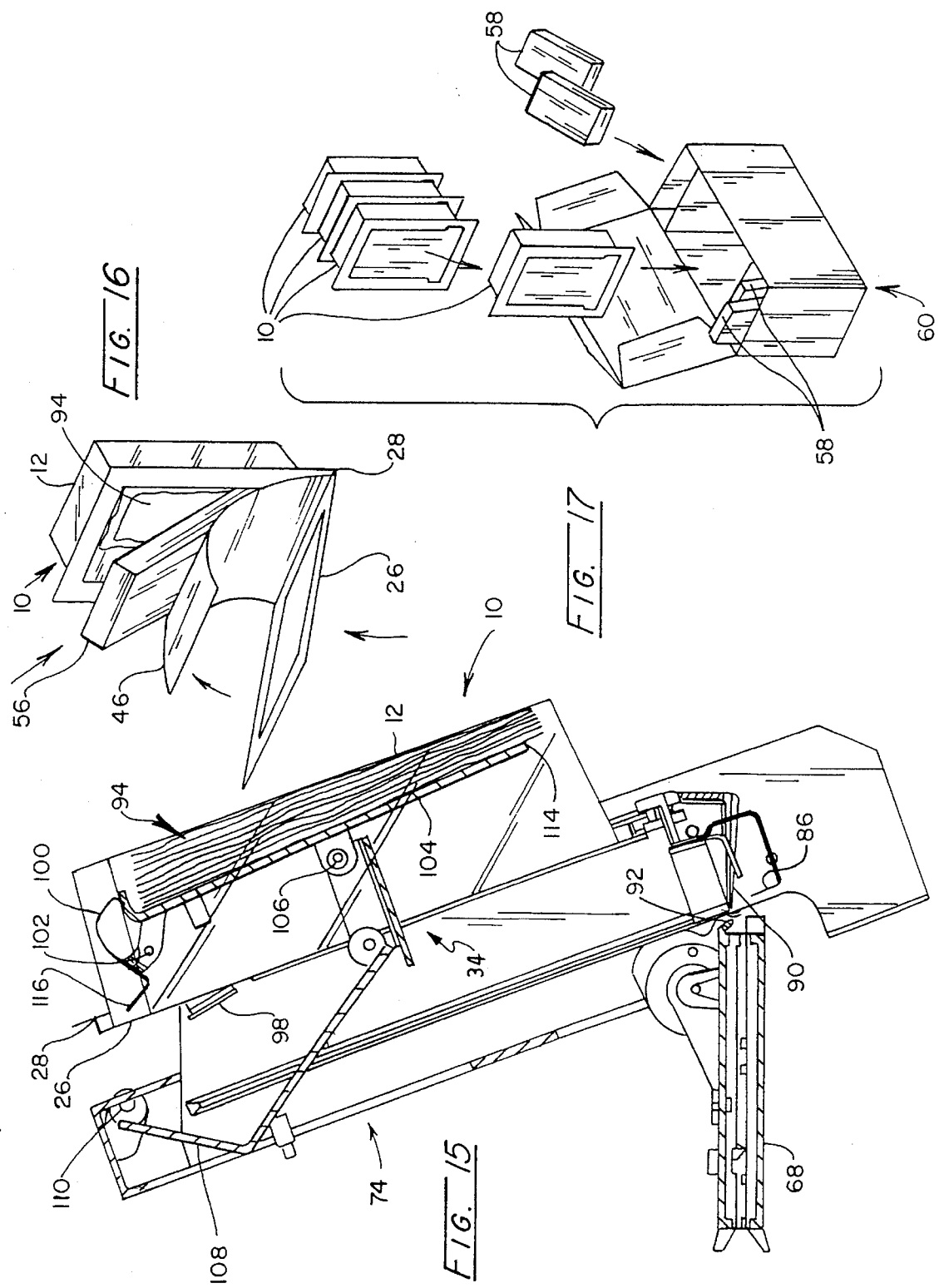

ECOLOGICAL SYSTEM FOR DELIVERING FILM UNITS, A CONTAINER FOR HOLDING FILM UNITS AND AN APPARATUS FOR PACKAGING TRASH FOR RECYCLING

BACKGROUND OF THE INVENTION

1. Field of the Invention

This invention relates to a system which is environmentally friendly while processing self-developing photographic film, in that, it uses materials which are largely reusable and recyclable. The system of this invention collects the trash and other residue from the developing process and deposits it in a container for transportation to a recycling center.

2. Description of the Prior Art

Self-developing, peel-apart film units are well known in the field of instant photography. Each film unit comprises a negative or photosensitive film sheet for forming a negative image of a subject, an image receiving film sheet for forming a positive subject image thereof and a rupturable pod of processing liquid. A positive image is formed on the positive sheet by means of a well known diffusion transfer process after the pod containing the processing liquid is ruptured and its contents spread between the positive and negative film sheets.

Film units of the aforementioned type are typically exposed in portable, multiple-exposure, instant-type photographic cameras or processed in large format film processing equipment. When employed in a camera as many as ten film units are provided in a single lightweight film pack, in a stacked relation, with the positive sheet on one side and the negative sheet on the other side of a pressure plate located within the film pack. Pull tabs are attached to one or both of the leading ends of the positive and negative sheets. After exposing an outer-most negative sheet at a film plane of the camera, a first tab attached to the negative sheet is withdrawn from the camera forcing the exposed negative to be turned 180° about the pressure plate and into superposition with the positive sheet. This movement causes a second tab attached to the forward ends of the positive and negative sheets to enter the bite of a pair of pressure applying spread rollers. A combination of the angle at which the first tab is attached and the force applied by a camera operator causes the first tab to detach from the negative sheet at this time.

After the first tab is so detached, the operator pulls the second tab so as to advance the positive and negative sheets between the pair of spread rollers in a superposed relation. At the beginning of the advancement of the positive and negative sheets the spread rollers apply pressure to a pod containing a processing liquid located at the leading ends thereof, thereby rupturing same, and spreading its contents between the superposed sheets in a thin uniform layer as the sheets are advanced therebetween. A positive image is formed on the positive sheet outside of the camera by a well known diffusion transfer process. After a required interval of time the positive image is manually peeled away from its associated negative and the negative, along with the second tab attached thereto, are discarded. A more detailed description of this particular type of peel-apart film may be found at pages 185–187 of a book entitled, "Camera Technology" by Norman Goldberg published in 1992 by the Academic Press.

The above-described peel-apart film format has several disadvantages, especially if considered for use in certain photographic apparatus. One disadvantage is film cost. In addition to the multiple tabs and the relatively large amounts of leader material required for each film unit, which necessarily increases material costs, economies of scale are limited by the fact that both a positive and a negative sheet must be included within a single film cassette. Including significantly larger numbers of film units within a single cassette in order to take advantage of such economies would substantially increase cassette size and thereby make such a cassette unwieldy for use by a camera operator. Another disadvantage is that this type of film format is not susceptible of inclusion in highly automated film processing equipment. processing a film unit by pulling certain tabs at various times in the film processing cycle is clearly a processing technique that is inherently manual.

Another disadvantage of this system is the environmentally unfriendly result of disposal of trash from the film developing process where the negative film sheet, empty pod and spent developer liquid are stripped from the positive and deposited in conventional trash containers on the street.

SUMMARY OF THE INVENTION

This invention intends to solve several of the aforementioned problems by providing a packaging system wherein the film sheets which are exposed, removed from a film cassette and developed to provide a visible image on the positive film sheet are a part of a trash collection and recycling system.

As a part of the developing system the negative film sheet, evacuated pod for developer liquid and any residual developer liquid remaining are stripped from the positive sheet and deposited in the same container in which the film sheets were originally delivered. The container is then resealed and delivered to a recycling center where the trash materials may be processed, recycled or simply re-used.

One aspect of the invention involves a three compartment carton for transporting four containers or trays of film units. In the preferred carton design, film transport trays are deposited in the center section of the carton as it is received by a customer.

Each of the film trays is hermetically sealed to prevent dust and excess moisture from contaminating film sheets within a pair of cassettes in each such tray. Each tray includes a cassette having positive film sheets and each positive film sheet includes a pod of developer liquid secured to its leading end. Each tray also includes a second cassette having a plurality of negative film sheets enclosed therein. Because the tray is hermetically sealed, neither cassette requires such sealing.

The cassette of positive film sheets is removed from the tray and inserted into a film developing apparatus. The cassette of negative film sheets is inserted into a camera where each sheet is exposed in sequence, as desired. A lightight transfer cassette encloses the negative cassette and the negative film sheet exposed by the camera which is subsequently deposited in the same film developing apparatus as the cassette of positive film sheets, by a camera operator.

The empty tray, which previously contained the positive and negative film cassettes, is mounted on the same film developing apparatus. Sheets from both the positive cassette and the transfer cassette are extracted by the film developing apparatus and mated to each other, one at a time, in sequence. The mated sheets pass through a pair of spread rollers to rupture the developer liquid pod and spread its contents between the film sheets. The mated pair of film sheets is next delivered along a first path into an imbibition chamber for a period of time sufficient to complete the diffusion transfer process. Thereafter, the mated sheets continue along the first path and as they exit the imbibition chamber a pick, traveling in a second path, engages the leading end of the mated sheets for the purpose of stripping the pod, negative sheet and residual developer liquid from the positive sheet. The positive sheet goes one way and the pick takes the negative sheet another way to deposit it on the face of a movable plate. The stripped negative sheet is clamped to the movable plate which is then pushed through an opening in the lid of the empty tray which originally delivered the cassettes to the customer.

After the supply of positive sheets in the positive cassette has been exhausted, the positive cassette is removed from the developing apparatus and manually deposited in the film tray which has been removed from the developing apparatus and which is only partially filled with stripped negative sheets.

After all four sets of trays have been used in this manner, the four trays containing the stripped negative sheets and positive cassette are re-sealed and placed in the original carton which delivered them. The empty negative cassettes from the camera are deposited in the two side compartments which were empty when the carton arrived. The carton is then shipped to a recycling or disposal center for further processing.

Objects, features and/or advantages of the present invention not understood from the above will be readily apparent from the following detailed description of the several preferred embodiments thereof when taken in conjunction with the accompanying drawings.

BRIEF DESCRIPTION OF THE DRAWINGS

FIG. 11 is a diagrammatic elevational view showing of apparatus within the developing apparatus for stripping the negative film sheet from the positive film sheet as mated sheets exit an imbibition chamber;

FIG. 12 is a diagrammatic elevational view which shows the apparatus of FIG. 11 as a continuing sequence in the stripping process;

FIG. 13 is a diagrammatic elevational view which shows the apparatus of FIG. 11 in the continuing sequence as the stripped negative sheet is clamped to the face plate of a trash ram;

FIG. 14 is a diagrammatic elevational view of the ram of FIG. 13 pushing the negative sheet into the cassette tray-trash container;

FIG. 15 is a diagrammatic elevational view of the ram and trash container combination with the ram bottomed on the container bottom;

FIG. 16 is a perspective view which shows the trash container of FIG. 15 being re-sealed with the empty positive cassette being inserted;

FIG. 17 shows the shipping carton of FIG. 8 as it is being re-filled with four cassette trays which are filled with trash as four empty negative cassettes are inserted in the side compartments of the carton.

DESCRIPTION OF THE PREFERRED EMBODIMENTS

Figure 1:
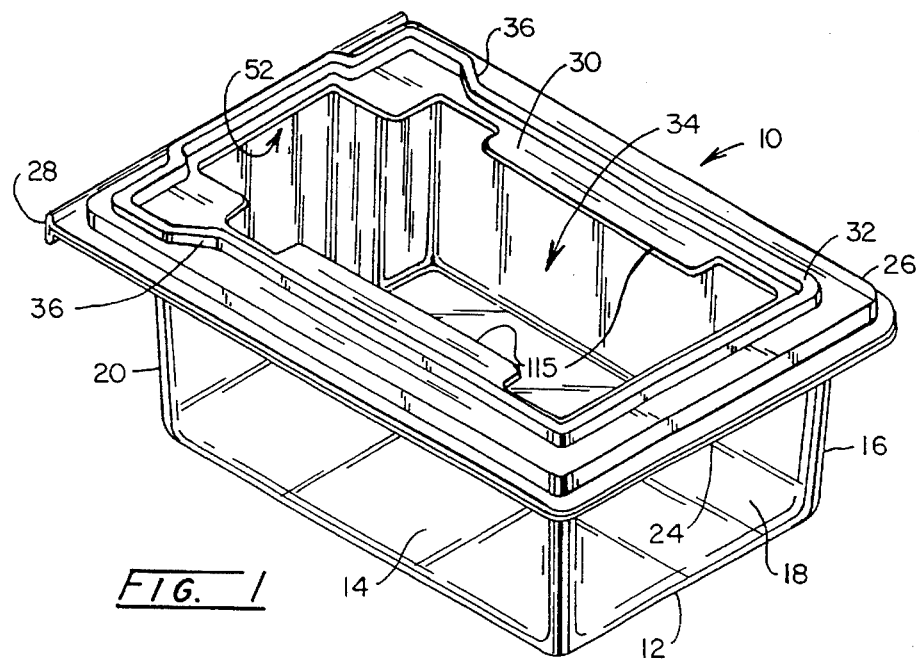
FIG. 1 is a perspective view of an empty cassette tray according to this invention.
Figure 2:
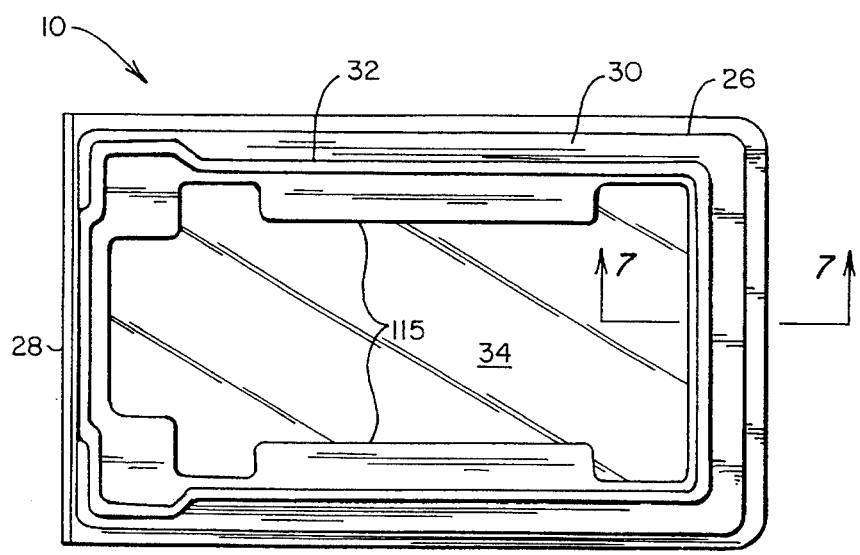
FIG. 2 is a top plan view of the tray of FIG. 1.

FIGS. 1–6 illustrate a container or tray 10 which is involved in essentially all of the procedural aspects of the invention to be described herein. Preferably the tray 10 is formed of a clear resin material and having a bottom wall 12 formed integral with upward projecting side walls 14 and 16 and end walls 18 and 20.

Looking to FIGS. 3, 4, 5 and 7, it will be observed that side walls 14 and 16 and end walls 18 and 20 diverge upwardly from bottom wall 12 to terminate in an inverted U-shaped ridge 22 which extends peripherally around the tray formed by the side walls and end walls. A flange 24 projects radially from the lower end of the U-shaped ridge approximately parallel with bottom wall 12.

In the preferred embodiment a lid 26 is formed integrally as a part of the tray 10 and is hingedly connected at 28 to flange 24 radially outward of the end wall 20. The upper surface 30 of lid 26 is preferably planar and is disposed generally parallel with bottom wall 12 when in a closed position. A reinforcing ridge 32 projects upwardly from planar surface 30 and extends peripherally around a uniquely shaped opening 34; the function of opening 34 will be explained subsequently in relation to FIGS. 11–15.

Ridge 32 serves to reinforce and strengthen the edge surfaces of opening 34 as well as the lid 26 generally. Offsets 36 of the ridge 32 near one end of the lid 26 serve as insertion limiting stops for when the tray 10 is inserted into a film processing unit. Tray 10 is inserted into a film processing unit for purposes of receiving negative sheets which must be disposed of as trash and which may be inserted through the opening 34. The offsets 36 allow flange 24 and closed lid 26 to slide into slots in the developing apparatus until the edges of the slot engage the offsets 36. This provides an alignment mechanism for the tray in general.

Figure 7:
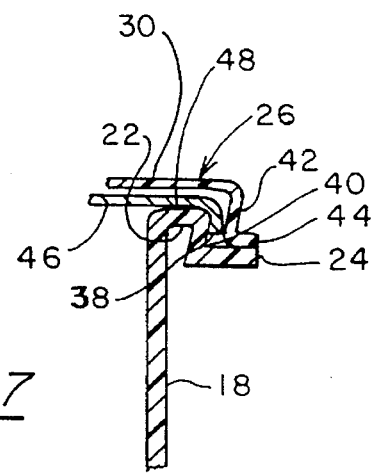
FIG. 7 is a fragmentary sectional view taken along line 7—7 of FIG. 2.

Looking particularly to FIG. 7, it will be observed that the outermost leg 38 of U-shaped ridge 22 is inclined inwardly toward end wall 18. This is true of the full length of the outer leg 38 such that the leg extending peripherally around the tray provides an undercut 40 such that a matingly configured leg 42 extending from peripherally around the tray from lid 26 toward the flange 24 snaps or hooks into undercut 40 to hold the lid in locked closed position. A strengthening flange 44 projects radially outward from the lower end of leg 42 generally parallel with flange 24.

FIGS. 1–6 illustrate tray 10 as being empty while FIG. 7 shows a fluid impermeable membrane or foil sheet 46 extending across the tray to hermetically secure its contents.

A layer of suitable adhesive is spread between foil sheet 46 and ridge surface 48 at the top of ridge 22. It will be further observed in FIG. 7 that the peripheral edge of sheet 46 is deflected down to be trapped between outermost leg 38 of ridge 22 and mating leg 42 on lid 26. The thickness of foil sheet 46 is exaggerated in FIG. 7 for purposes of illustration but the adhesive on surface 48 and the clamping or locking action of leg 42 provides a double seal for foil sheet 46. This double seal minimizes the possibility of dust and moisture reaching the contents of tray 10 when it is being transported from one location to another. It will further be noted that the flat or planar surface 30 of lid 26 is vertically spaced from sheet 46 as illustrated in FIG. 7. Inherently it is also spaced from ridge surface 48 when foil sheet 46 has been stripped from the tray 10 and the lid 26 is replaced thereon.

An additional feature of end wall 20 of tray 10 is the offset section 50 which forms a passageway 52 within the interior of tray 10. The passageway 52 serves to accommodate a clamp used in depositing waste material in tray 10 which will be explained in detail below in relation to the film developing and trash disposal process and apparatus.

Figure 6:
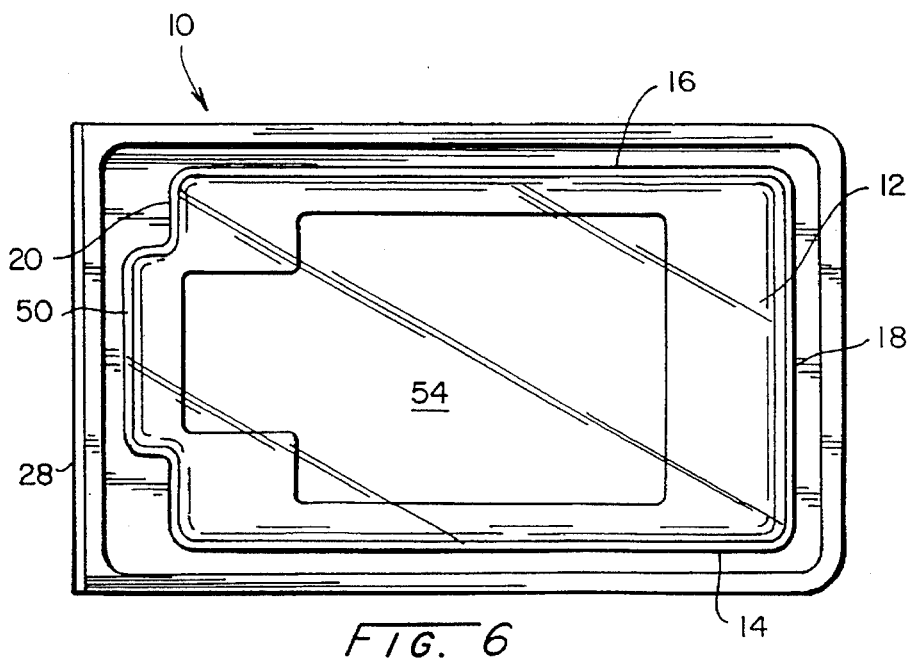
FIG. 6 is a bottom plan view of the tray of FIG. 3.

FIG. 6 illustrates a depression 54 in bottom wall 12 and it will be noted that it is of a particular generally rectangular shape and it serves two purposes. The depression 54 strengthens the structure of bottom wall 12 and in addition it serves as the engaging surface for trash inserted through opening 34 while leaving a peripheral trough or depression around surface 54 to accommodate excess liquid which may accompany trash inserted into tray 10 and pressed against the inside surface of depression 54.

Figure 8:
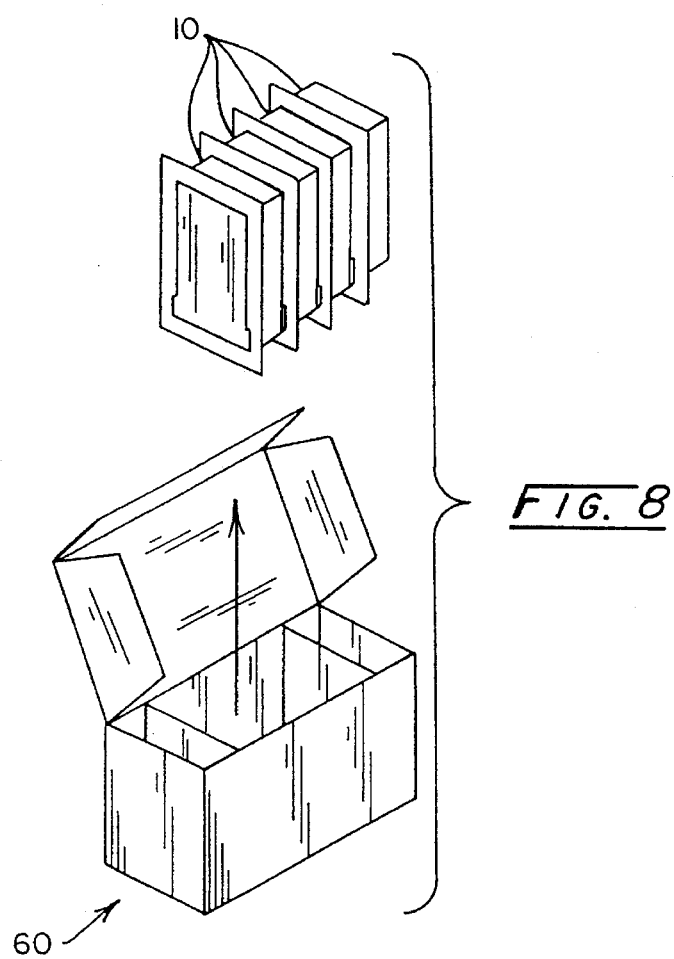
FIG. 8 is a perspective view of four sealed film trays according to FIG. 1 as removed from a shipping carton.
Figure 9:
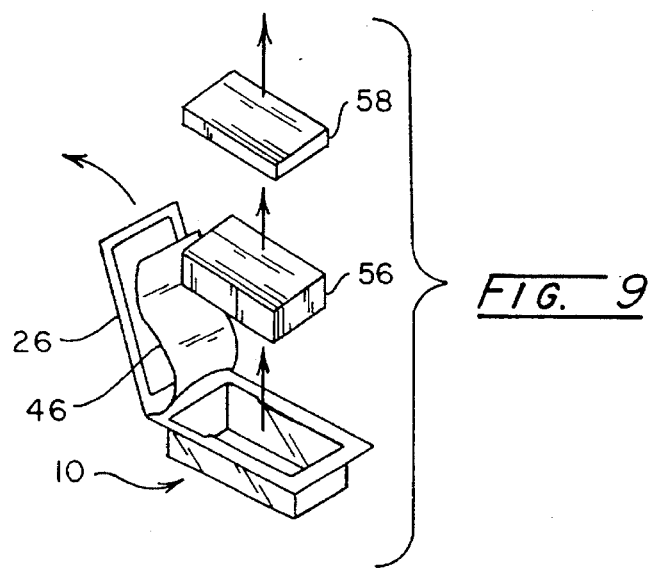
FIG. 9 is a perspective view of an open film tray with the positive and negative film cassettes in an elevated position.

Looking now to FIGS. 8 and 9, tray 10 is designed to receive a pair of cassettes 56, 58 before peel sheet 46 is applied to hermetically seal the contents against moisture and dust as illustrated in FIG. 7 and before lid 26 is snapped into place. The benefit is that the two cassettes 56, 58 do not have to be separately hermetically sealed when transported to a user. It will be noted that cassette 56 is shown to be larger than cassette 58. This is intentional. Cassette 58 is intended to be filled with a plurality of negative film sheets. Because of their structure, negative film sheets occupy a smaller volume of space than the cassette 56 which is intended to contain a similar number of positive film sheets. Each positive film sheet incorporates a pod of developer liquid on its leading end and possibly an excess liquid trap on its trailing end. It is because of the pod of developer liquid that the cassette 56 containing the positive film sheets requires a greater volume to house the same number of sheets as are contained in negative film cassette 58.

While it is not required, it is preferred that four full film trays 10 be placed in a box or carton 60 having three separate compartments as illustrated in FIG. 8. Carton 60, shown in open empty condition in FIG. 8 receives the four trays 10 in the central compartment while the side compartments remain empty when the carton is delivered to a user. The side compartments have a use which will be described in relation to FIG. 17 when the carton and four trays of developer trash is assembled and forwarded to a disposal and recycling center.

Figure 10:
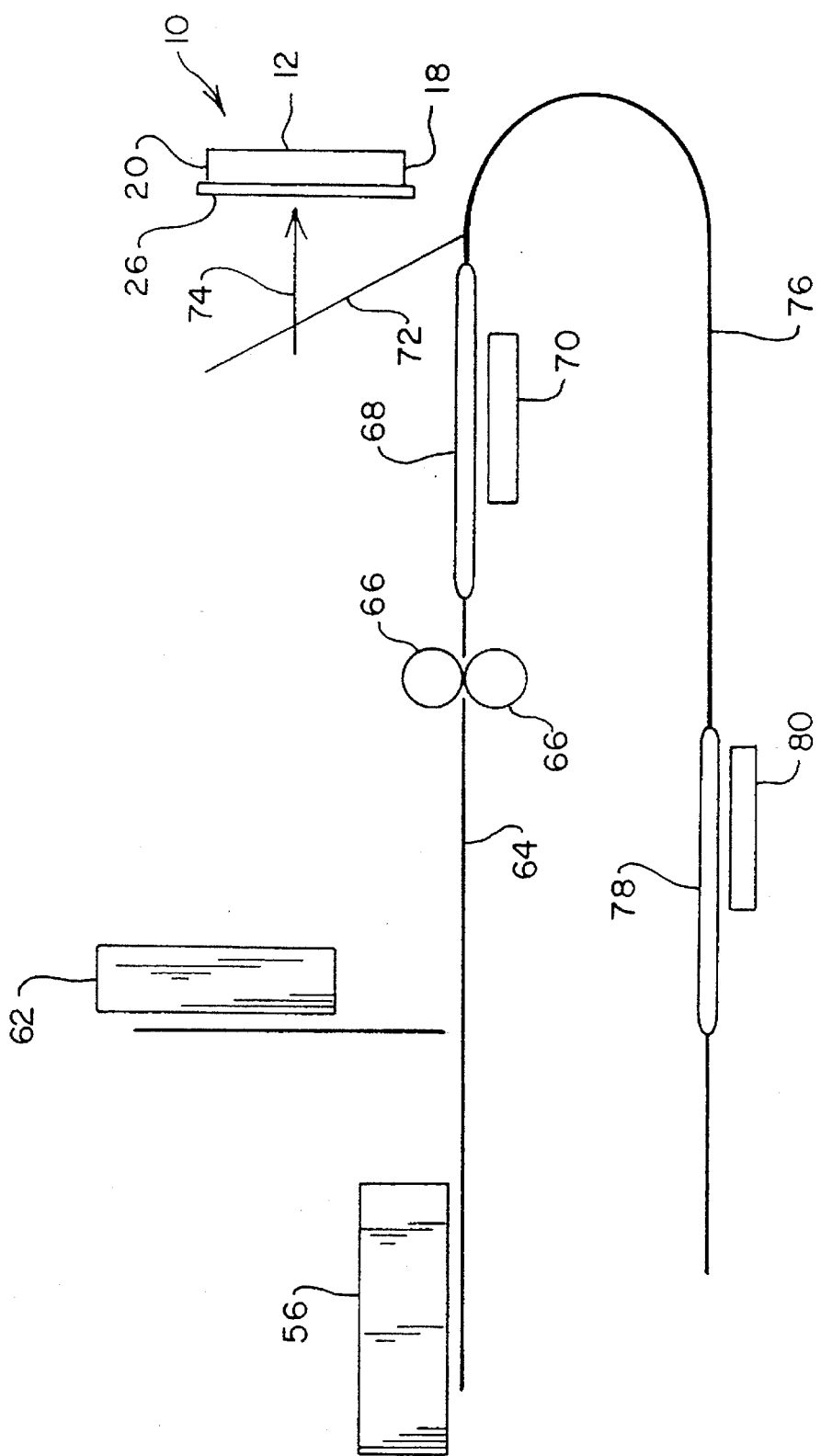
FIG. 10 is a schematic view of the procedural sequence according to this invention for developing film after negative film sheets have been exposed and delivered to the developing apparatus.

The preferred procedure for a user of the apparatus is for the peel strip 46 to be stripped from tray 10 and the cassettes 56 and 58 removed therefrom as illustrated in FIG. 9. Cassette 58 is inserted into a camera (not shown) within a transfer cassette 62 where a negative film sheet enclosed therein is exposed. After film exposure, transfer cassette 62 is inserted into a film processing apparatus illustrated schematically in FIG. 10. Cassette 56 containing the positive film sheets, pods of developer liquid and trailing liquid trap is inserted, in operative position, into the developer apparatus. Thereafter, one sheet from each of cassettes 56, 62 is extracted and mated by appropriate means so that the exposed portion of the negative sheet from cassette 62 is in registration with an appropriate section of a positive film sheet from cassette 56.

The mated sheets with the pod of developer liquid on the leading end progresses along a first path 64 to a pair of rollers 66 which pull the mated film sheets through the bite of the rollers, rupture the pod of developer liquid and spread the liquid contents between the two sheets to thereby cause a visible image to be formed on the positive film sheet from the exposed negative film sheet, by a well known diffusion transfer process.

Film sheets are ejected from the bite of rollers 66 and continue along first path 64 to an imbibition chamber 68 which is heated by a heater 70. After a short pause in chamber 68 to allow the diffusion transfer process to work, the mated sheets are expelled from chamber 68 and separated; the empty pod, the negative film sheet and any residual developer liquid are stripped from the positive film sheet and moved along a second path 72 to a ram 74 which pushes them into the tray 10. Tray 10 has been mounted on the developer apparatus after peel sheet 46 is stripped from ridge surface 48 and cassette 56 and 58 removed. Lid 26 is closed before tray 10 is mounted on the developer apparatus.

After the negative film sheet is stripped from the positive film sheet, the positive film sheet traverses a third path 76 to a drying chamber 78 heated by a second heater 80. After a suitable drying period, the positive film sheet having a visible image thereon continues along path 76 to be packaged or observed by a user of the film.

FIGS. 11–15 illustrate a procedural sequence of stripping the negative film sheet from the positive sheet. FIG. 11 illustrates the mated pair of film sheets 82 in the imbibition chamber 68 where the leading end 84 has just exited the chamber. A triggering mechanism (not shown) acts appropriately to activate a pick 86 to move in a second path 72 traverse to first path 64. The pick 86 is structured to engage a pocket 88 on the lower side of the leading end 84 of the mated film sheets. Movement of pick 86 along path 72 separates the two sheets 94, 96 to carry the waste parts attached to sheet 94 for disposal along path 72 and the sheet 96, to be retained for viewing, along the path 76. A blade 90 is located in the apparatus just downstream of a stripper bar 92 which is located just downstream and above the exit opening in the downstream end of the imbibition chamber 68.

It will be observed that movement of pick 86 along second path 72 is at an angle of greater than 90° from the direction of first path 64. Experimental results have shown that a change of direction at stripper 92 in the range of about 91° to about 120° is most effective in separating negative sheet 94 from positive sheet 96. Most preferably the angle between path 64 and path 72 is about 110°. The blade 90 serves only to enhance the separation should there be some sticking of negative sheet 94 as the positive sheet 96 moves along the third path 76.

FIG. 12 illustrates pick 86 having engaged pocket 88 and advancing along the path 72.

FIG. 13 shows pick 86 as it approaches its upper limit of movement where it engages a switch or button 98 which releases a spring biased clamp 100 to pivot about an axis 102 to clamp the leading end of sheet 94 to the front face of a plate 104 of the ram 74. The leading end of stripped sheet 94 engages a sheet positioning flange on plate 104 as the clamp 100 snaps into clamping position.

The rear face of plate 104 is pivotally mounted on a pivot bar at 106 to a lever arm 108. Lever arm 108 is mounted to reciprocate about an axis 110 from a retracted position where arm 108 abuts a stop 112 as illustrated in FIGS. 11, 12 and 13 to an extended position as illustrated in FIG. 15 where plate 104 has penetrated opening 34 in the lid 26 of tray 10 and engages the bottom 12 of tray 10 or a stack of compressed sheets 94 already deposited therein.

Looking to FIG. 14, after pick 86 has tripped switch 98 and clamp 100 secures negative sheet 94 in place, pick 86 is retracted to its initial position as shown in FIG. 11. The ram 74 then acts automatically to pivot arm 108 about axis 110 which causes plate 104 to push negative sheet 94 through opening 34 in the lid 26 of the tray 10. An observation of FIG. 14 shows that during the pivoting of arm 108, the distal end 114 of the plate 104 most remote from axis 110 will be the first part of said plate 104 to penetrate opening 34. The reason for this specifically designed feature is to have a controlled insertion of negative sheet 94 through opening 34. Negative sheet 94 is generally rectangular in shape and the edges extend traversal of the forward face of plate 104. Plate 104 is configured generally in the shape of opening 34 in lid 26 although somewhat smaller in transverse direction so the edges of negative sheet 94 can bend back around the edges of plate 104 as the plate 104 pushes it through the opening 34 without a great deal of mechanical force being required. The fact that plate 104 enters opening 34 progressively reduces the amount of physical force required to push the plate and negative sheet through the opening 34.

The transition between FIGS. 14 and 15 shows that as arm 108 continues its movement from left to right, the distal end 114 of plate 104 engages the bottom 12 or already deposited sheets 94 and then begins to pivot clockwise as best seen in FIG. 15. Then at the end of the ram stroke plate 104 is pressing against the sheet (or sheets) 94 to mash it into a somewhat compressed stack.

Upon retraction of the ram 74 from the tray 10, the spent developer liquid on sheet 94 may have engaged the surface of the plate 104 such that it will be lightly bonded thereto rather than having disengaged when the plate presses the negative sheet against the bottom 12 of the tray. To solve this problem and ensure stripping of the negative sheet from the plate 104, stripper tabs 115 (FIGS. 1 and 2) project inwardly at the middle area of the opening 34 and will engage the side edges of the rectangular shaped negative sheet 94 and will peel it from the forward face of the plate. The word "strip" is used advisedly because the plate rotates counterclockwise about pivot 106 as the ram 74 begins to retract such that the plate assumes its normally spring biased position and the upper part of the plate passes through the upper part of opening 34 as it retracts prior the time the distal end 114 passes through the lower part of opening 34. That is, negative sheet 94 will be peeled from top to bottom as the ram retracts.

The trailing portion of clamp 100 includes a trigger or clamp release 116 which engages the face of lid 26 as the clamp 100 moves through the opening 34 and into the tray 10. Thereby, the trigger 116 cocks or resets the spring biased clamp 100 and releases the negative sheet 94 on the front face of the plate 104. As the clamp 100 is released it pivots about the axis 102 and rises toward tray end wall 20. This is where the passageway 52 comes into play. The passageway 52 formed by offset section 50 allows the clamp 100 to pivot up into the passageway 52 where it may be withdrawn through opening 34 when the ram is retracted to the position illustrated in FIG. 11.

Figure 3:
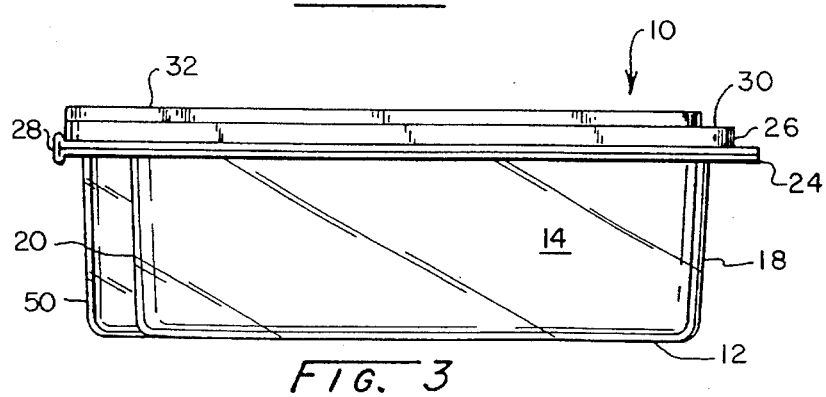
FIG. 3 is a side elevational view of the tray of FIG. 2.
Figure 4:
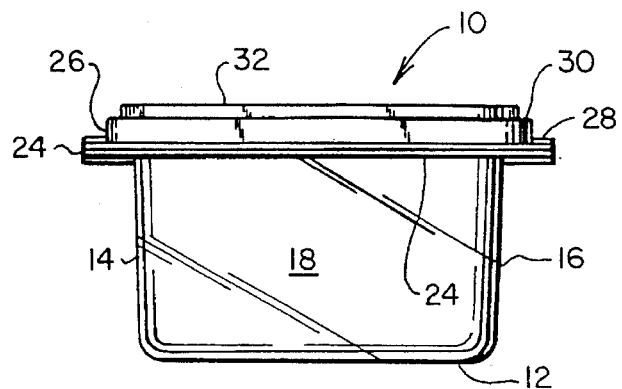
FIG. 4 is a right hand side end elevational view of the tray of FIG. 3.
Figure 5:
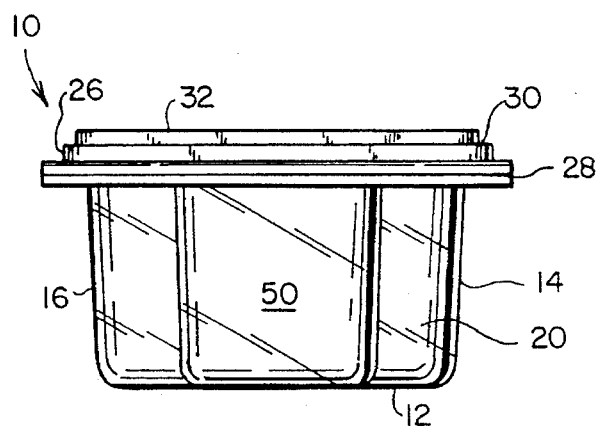
FIG. 5 is a left hand side elevational view of the tray of FIG. 3.

One final observation of offset 50 in FIGS. 3, 5 and 6 will show that the offset provides a convenient handle hold for the operator of the developing apparatus to grasp the tray 10 to insert it into operative position and later to retract it from the developer apparatus when it is adequately filled with negative sheets of film and related trash. For the purposes of this invention it will be assumed that the stack of negative sheets 94 in tray 10 will be adequate for disposal when one set of negative sheets has been used which were originally stored in cassette 58.

Observing FIGS. 16 and 17, after tray 10 is removed from the developer apparatus and being adequately filled with used negatives 94, the empty positive cassette 56 is also removed from the apparatus and manually inserted into tray 10 on top of the negative sheets 94. Thereafter, the original peel sheet 46 or a similar one is applied against the face 48 of ridge 22 and lid 26 is snapped into place thereby hermetically sealing the trash within the tray. As illustrated in FIG. 17, four trays 10 are re-inserted into the center portion of carton 60 and the empty negative cassettes 58 are deposited into side compartments. Thereafter the carton 60 is sealed and shipped to a suitable disposal and recycling center.

Figure 18:
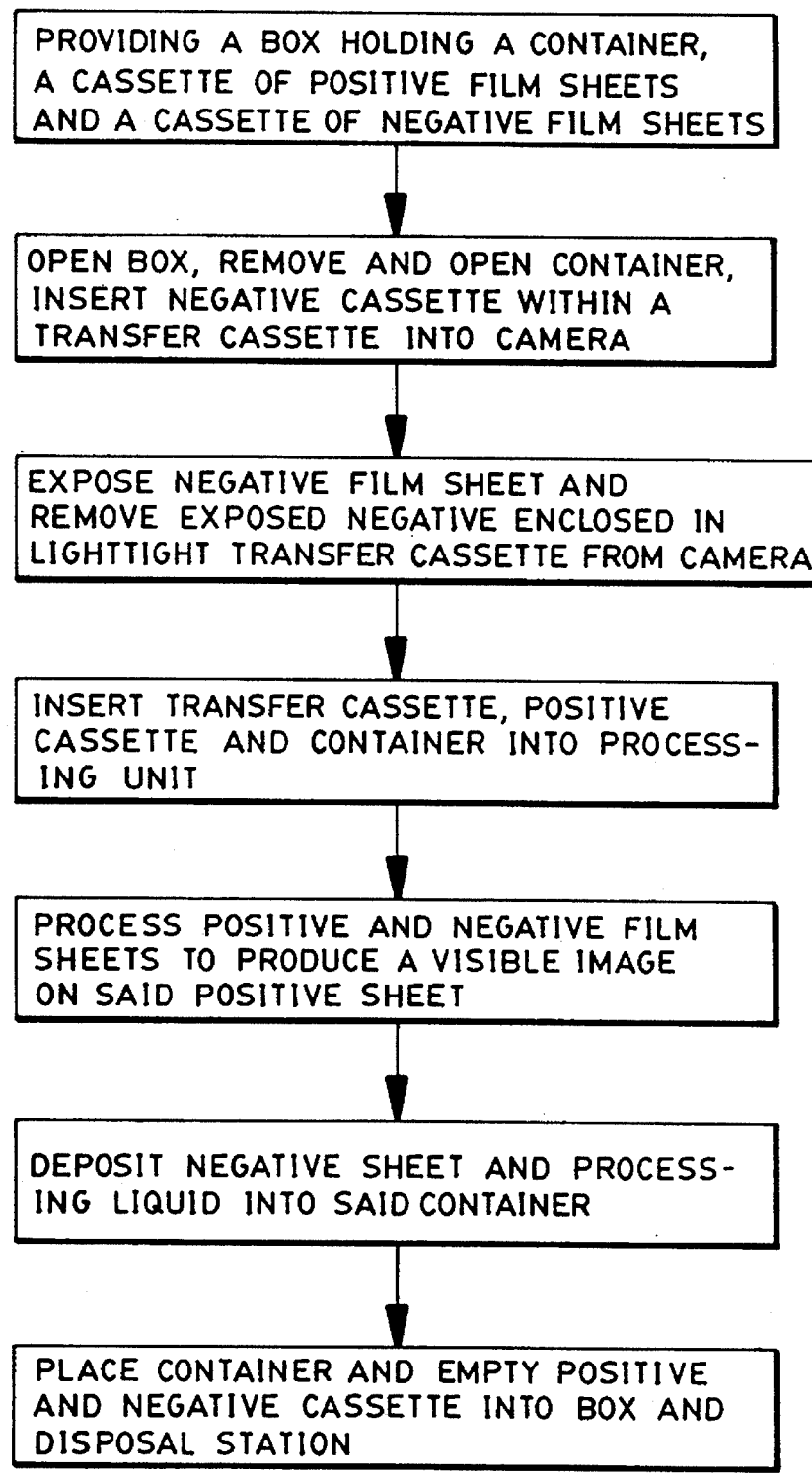
FIG. 18 is a block flow diagram showing the procedural sequence of this invention in its broadest concept.

FIG. 18 is a block diagram showing the flow procedure as described above in its broadest procedural steps.

It will be apparent to those skilled in the art from the foregoing description of the inventive concept that various improvements and modifications may be made without departing from its true scope. The embodiments described herein are merely illustrative and therefore should not be viewed as the only embodiments which might encompass the invention.

We claim:

1. A process for developing film and disposing of the residue, comprising the steps of:

mating a positive film sheet with an exposed negative film sheet;

spreading a layer of processing liquid between said sheets, peeling said negative film sheet and any residual portion of said liquid from said positive film sheet, after allowing a suitable period of time for said processing liquid to work;

pushing said peeled negative film sheet and residual liquid into a trash container; and sealing said container for shipment to a recycling and disposal location.

2. The process of claim 1 wherein the step of peeling includes engaging a leading end of said mated sheets with a transversely moving pick and directing said negative sheet in a direction transverse to the movement of said positive sheet.

3. The process of claim 2 including said pick depositing said negative sheet on the front face of a ram, said ram serving as apparatus for said pushing of said peeled negative film sheet; and clamping said negative sheet to said ram in response to movement of said pick.

4. The process of claim 3 including providing said container with a lid, said lid including an opening to receive trash; and mounting said container with said opening transverse to the direction of movement of said ram when pushing said negative film sheet into said container.

5. The process of claim 4 including releasing said negative sheet clamp after said front face of said ram has passed through said lid opening.

6. The process of claim 5 including shaping said opening and said ram front face to allow said ram to pass through said opening without contacting the edges of said opening; and retracting said ram through said opening such that said opening edges cooperate with said ram to strip trash from said ram face where said trash extends transversely of said ram face and beyond the edges of said opening.

7. The process of claim I wherein said container includes an opening to receive said negative film sheet pushed by a transversely moving ram, and further includes the step of:

clamping said negative film sheet to said ram prior to pushing it through said opening.

8. The process of claim 7 including releasing said clamp after said ram passes into said opening.

9. The process of claim 8 including shaping said opening and said ram front face to allow said ram to pass through said opening without contacting the edges of said opening; and retracting said ram through said opening such that said opening edges cooperate with said ram to strip trash from said ram face where said trash extends transversely of said ram face and beyond the edges of said opening.

10. A trash container comprising, a rear wall joined to four sidewalls, said sidewalls diverging from each other at an acute angle and terminating in a planer shoulder which is remote from and parallel with said rear wall;

a lid movably secured to said shoulder, said lid combining with said rear wall and sidewalls to form an enclosure, said lid including an opening therethrough for receiving trash, said opening including stripper tabs at its edge; and one said sidewall including an outwardly projecting offset, said offset providing a passage extending from said shoulder to said rear wall.

11. The trash container of claim 10 wherein said rear wall includes a central planer surface raised toward said planer shoulder and circumscribed by a depression.

12. The trash container of claim 11 wherein said shoulder includes a circumferentially extending ridge upstanding from said planer shoulder surface, said ridge being undercut at its outermost surface; and said lid including a circumferentially extending flange projecting toward said shoulder surface and configured to slide over said outermost ridge surface and fit into said undercut to thereby lock said ridge and flange together.

13. The trash container of claim 12 including a fluid impermeable membrane stretching across the space circumscribed by said ridge and being clamped into place between said ridge and said lid.

14. The trash container of claim 10 wherein said shoulder includes a circumferentially extending ridge upstanding from said planer shoulder surface, said ridge being undercut at its outermost surface, said lid including a circumferentially flange projecting toward said shoulder surface and configured to slide over said outermost ridge surface and fit into said undercut to thereby lock said ridge and flange together.

15. The trash container of claim 14 including a fluid impermeable membrane stretching across the space circumscribed by said ridge and clamped into place between said ridge and said lid.

16. In combination, a container and its contents comprising:

said container including a rear wall, a plurality of sidewalls connected to and extending from said rear wall, and a lid covering said sidewalls to form an enclosure;

said lid including an opening to receive trash inserted into said enclosure;

a collection of trash within said enclosure, said trash comprising a plurality of layers of negative film sheets and a residue of processing liquid sandwiched together to form a block; and a sealing membrane extending across said opening and clamped in fluid tight engagement between said lid and said sidewalls.

17. The combination of claim 16 including a ridge extending circumferentially around said sidewalls and projecting therefrom in a direction away from said lid, said ridge being undercut at its circumferentially outermost surface;

said lid including a circumferentially extending flange projecting toward said sidewalls and including a section converging circumferentially inwardly; and, said flange encircling said ridge and said converging section fitting into said undercut of said ridge to lock said lid to said ridge.

18. The combination of claim 17 wherein said membrane is circumferentially clamped between said converging flange section and said undercut ridge section.

19. Apparatus for collecting trash comprising:

a divider for separating a positive film sheet from a negative film sheet in a photographic film developing apparatus and depositing the separated negative sheet on a reciprocating ram;

a clamp for holding said separated negative sheet on said reciprocating ram;

said ram being configured to reciprocate into and out of a trash container;

said container including a closed lid with an opening therein, said opening being configured to receive said ram and said separated negative sheet; and said ram and container including a release for said clamp upon said ram passing through said lid opening of said container.

20. The apparatus of claim 19 wherein said divider comprises:

a pick for engaging said negative sheet for peeling said negative sheet from said positive sheet;

a first propeller for moving said sheets in one direction; and a second propeller for moving said pick in a direction transverse to said one direction.

21. The apparatus of claim 20 including a trigger actuated by said pick to move said clamp into said holding position.

22. The apparatus of claim 21 including stripper tabs at the edges of said opening in said lid to strip trash from said ram as it is withdrawn from said container.

23. The apparatus of claim 22 wherein said clamp and release are combined as a single piece, said piece being pivoted about an axis intermediate its ends, one said end being the forward end comprising said clamp, the other said end being a trailing end comprising a lever, with said clamp in clamping position, said lever projecting from said ram in a direction parallel with said lid opening and for a distance to prevent said lever from entering said container with said ram without pivoting about said axis due to a biasing force by said lid surface against said lever which thereby releases said clamp.

24. The apparatus of claim 19 including stripper tabs at the edges of said opening in said lid to strip trash from said ram as it is withdrawn from said container.

25. The apparatus of claim 24 wherein said clamp and release are combined as a single piece, said piece being pivoted about an axis intermediate its ends, one said end being the forward end comprising said clamp, the other said end being a trailing end comprising a lever, with said clamp in clamping position, said lever projecting from said ram in a direction parallel with said lid opening and for a distance to prevent said lever from entering said container with said ram without pivoting about said axis due to a biasing force by said lid surface against said lever which thereby releases said clamp.

26. The apparatus of claim 19 wherein said clamp and release are combined as a single piece, said piece being pivoted about an axis intermediate its ends, one said end being the forward end comprising said clamp, the other said end being a trailing end comprising a lever, with said clamp in clamping position, said lever projecting from said ram in a direction parallel with said lid opening and for a distance to prevent said lever from entering said container with said ram without pivoting about said axis due to a biasing force by said lid surface against said lever which thereby releases said clamp.

27. An environmentally friendly handling system for transporting, processing and disposing of photographic materials, comprising the steps of:

assembling a cassette of negative film sheets with a cassette of positive film sheets, said positive film sheets having attached pods of processing liquid at one end, and inserting both cassettes into a tray and sealing said tray;

breaking said seal and removing said cassettes;

mounting said cassette of negative film sheets into a camera, exposing said negative film sheets and transferring said exposed sheets to a film processor;

mounting said cassette of positive film sheets on said film processor;

mounting said tray or one of similar configuration on said film processor;

mating an exposed negative sheet with a positive sheet, rupturing said pod and spreading its liquid contents between said sheets, thereby forming a visible image on said positive sheet;

separating said positive sheet from said negative sheet; and depositing said separated negative sheet into said tray.

28. The system of claim 27 further comprising the steps of:

resealing said tray with the same seal or a seal similar to said broken seal; and delivering said resealed box to a location for recycling and disposal.

29. The system of claim 28 wherein said separating step includes propelling each of said mated sheets along a first path after said liquid spreading, propelling a pick along a second path in a direction transverse to said first path, said pick engaging said pod and negative sheet and peeling them from said positive sheet.

30. The system of claim 29 including said pick delivering said peeled pod and negative sheet to a ram, said ram pushing said peeled pod and negative sheet into said tray through an opening in a closed lid of said tray.

31. The system of claim 30 including clamping said peeled negative sheet and pod to said ram and retracting said pick prior to pushing said ram into said tray.

32. The system of claim 31 including unclamping said peeled negative sheet and pod from said ram after said ram enters said tray.

33. The system of claim 32 including actuating said clamp to clamp said negative sheet to said ram by movement of said pick.

34. The system of claim 27 wherein said separating step includes propelling each of said mated sheets along a first path after said liquid spreading, propelling a pick along a second path in a direction transverse to said first path, said pick engaging said pod and negative sheet and peeling them from said positive sheet.

35. The system of claim 34 including said pick delivering said peeled pod and negative sheet to a ram, said ram pushing said peeled pod and negative sheet into said tray through an opening in a closed lid of said tray.

36. The system of claim 35 including clamping said peeled negative sheet and pod to said ram and retracting said pick prior to pushing said ram into said tray.

37. The system of claim 36 including unclamping said peeled negative sheet and pod from said ram after said ram enters said tray.

38. The system of claim 37 including actuating said clamp to clamp said negative sheet to said ram by movement of said pick.

39. Apparatus for separating positive and negative film sheets after processing liquid has been spread between them in a liquid spreading area comprising:

said positive and negative sheets being mated in juxtaposed position, each sheet including a leading end and a trailing end, the leading end of said positive sheet including an evacuated pod which previously held said processing liquid;

said leading end of said positive sheet being secured to said leading end of said negative sheet;

a first path in said apparatus defining movement of said mated sheets from said liquid spreading area to a peeler, said peeler comprising a pick mounted to reciprocate in a second path transverse to said first path, said pick being located on the positive sheet side of said mated sheets as said mated sheets move in said first path to a first triggering mechanism; and said pick being actuated by said first triggering mechanism to move along said second path to mechanically engage said leading end of said positive sheet and peel said negative sheet and pod from said positive sheet.

40. The apparatus of claim 39 including a stripper bar mounted perpendicular to said first path and at a location along said first path and after said liquid spreading area, said bar engaging said negative sheet as said pick peels said negative sheet from said positive sheet.

41. The apparatus of claim 40 wherein the angle between said first path and said second path is in the range 91° to 120°.

42. The apparatus of claim 40 wherein said angle is about 110°.

43. The apparatus of claim 39 wherein the angle between said first path and said second path is in the range 91° to 120°.

44. The apparatus of claim 43 wherein said angle is about 110°.

45. A trash packing apparatus comprising:

a plate having a front side and a rear side, said front side serving to engage trash to be rammed into a container;

said plate being pivotally mounted on a bar, said bar being connected to said rear side and at a location intermediate first and second ends of said plate;

said bar being connected to a pivotable arm, said arm being pivotable in an arc which is perpendicular to said front side of said plate; and said first end of said plate including a clamp to press said trash against said front side, and a clamp release movable with said plate actuated by penetration of said front end of said plate into said container to release said trash from said plate.

46. The trash packing apparatus of claim 45 wherein said pivotable arm pivots about an axis located nearer to said clamp than to said second plate end.

47. The trash packing apparatus of claim 46 including a trash positioning flange for positioning trash on said plate front side and in a location to be engaged by said clamp.

48. The trash packing apparatus of claim 47 including a container for receiving said trash, said container including an opening oriented to receive said plate, said container including a bottom oriented to engage said second end of said plate before said first end of said plate engages said bottom.

49. The trash packing apparatus of claim 48 wherein said container opening is parallel with said bottom and configured to release said clamp after said first plate end passes through said opening.

50. The trash packing apparatus of claim 45 including a container for receiving said trash, said container including an opening oriented to receive said plate, said container including a bottom oriented to engage said second end of said plate before said first end of said plate engages said bottom.

51. The trash packing apparatus of claim 50 wherein said container opening is parallel with said bottom and configured to release said clamp after said first plate end passes through said opening.

* * * * *